United States Patent [19]
Tseng

[11] Patent Number: 4,991,201
[45] Date of Patent: Feb. 5, 1991

[54] SCA FACSIMILE ADAPTER

[76] Inventor: Ling-Yuan Tseng, 5th Fl., 1-1, Lane 3, Alley 128, ChinHwa Street, ChinMei, Taippei, Taiwan, 11708

[21] Appl. No.: 362,567

[22] Filed: Jun. 7, 1989

[51] Int. Cl.$^5$ .............................................. H04N 1/32
[52] U.S. Cl. .................................... 379/100; 455/45; 379/58; 379/93
[58] Field of Search ............... 379/100, 59, 67, 93; 455/45

[56] References Cited

U.S. PATENT DOCUMENTS

| | | | |
|---|---|---|---|
| 3,696,297 | 10/1972 | Otero | 455/45 |
| 4,718,080 | 1/1988 | Serrano et al. | 379/59 |
| 4,746,986 | 5/1924 | Tanigawa | 379/100 |
| 4,809,297 | 2/1989 | Polansky et al. | 379/100 |
| 4,837,812 | 6/1989 | Takahashi et al. | 379/100 |

FOREIGN PATENT DOCUMENTS 0073852 4/1987 Japan ................................ 379/100

Primary Examiner—Jin F. Ng
Assistant Examiner—Stella L. Woo
Attorney, Agent, or Firm—Darby & Darby

[57] ABSTRACT

A facsimile signal control system adapted to be connected between a facsimile machine and a telephone line, comprises an RF signal receiver adapted to receive and demodulate RF signals from an antenna, a change-over switch, a first port for connection to a facsimile machine, and a second port for connection to a telephone line and an interface circuit. A control circuit is connected to apply the demodculated facsimile signals from the signal receiver to the interface circuit. The control means further comprises means for controlling the change-over switch to selectively connect the first port to either the second port or the interface circuit.

22 Claims, 1 Drawing Sheet

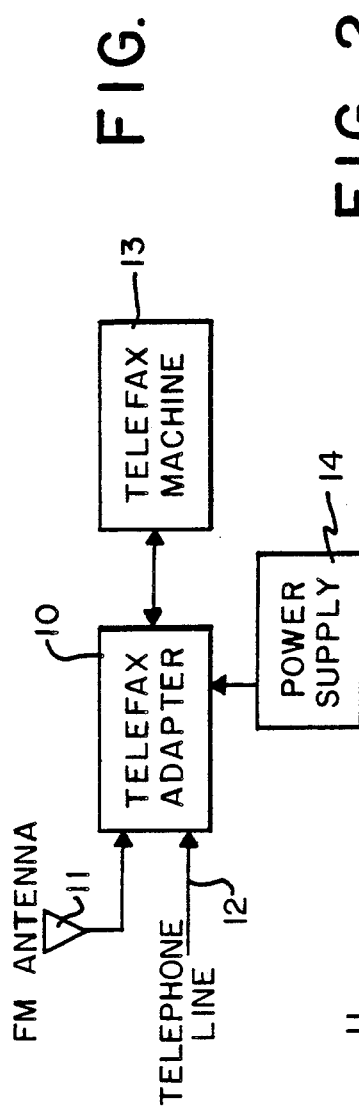
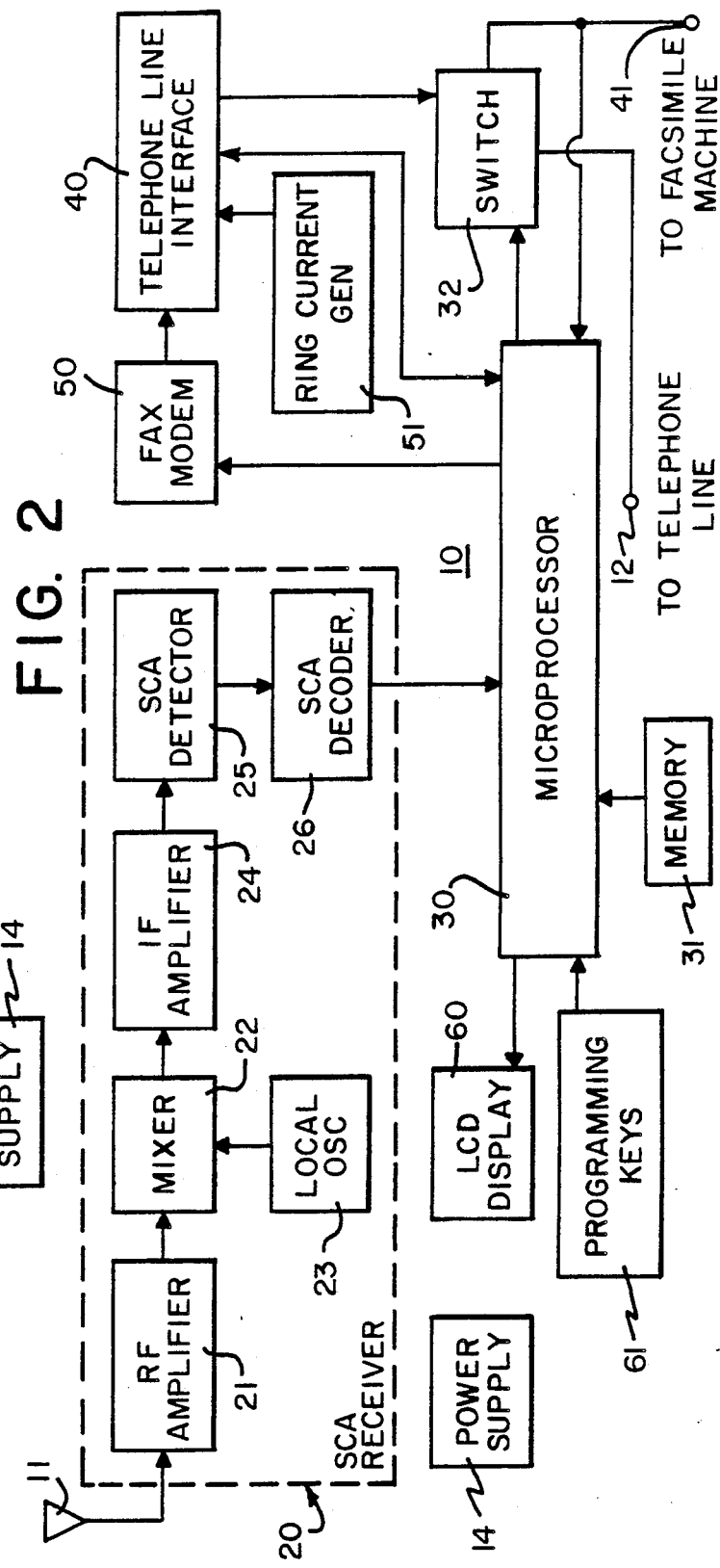

SCA FACSIMILE ADAPTER

BACKGROUND OF THE INVENTION

This invention is directed to the provision of an adapter that enables the use of a conventional facsimile machine to send signals to, and receive signals from, a wired telephone link, as well as to receive facsimile signals via a wireless link.

U.S. Pat. Nos. 4,654,867; 4,694,473 and 4,697,281 disclose cellular telephone communication systems adapted to transmit and receive data signals via an RS232 interface. Publications have also disclosed the use of facsimile machines to send and receive facsimile signals via wireless devices, such as a cellular phone (Personal Communications Technology, June 1986, pp 39, 42, and The Washington Post, Style Section, Dec. 29, 1988. pp D1, D9).

The known systems thus require the use of relatively expensive cellular equipment and subscription to cellular telephone systems, and are hence not adaptable to wireless facsimile reception in a simple and economical manner.

SUMMARY OF THE INVENTION

Briefly stated, in accordance with the invention, an adapter is provided that includes a change-over switch controlled to enable a facsimile machine connected thereto to either communicate in the conventional manner via a telephone line, or to receive a facsimile message from an SCA receiver. The SCA receiver receives FM RF signals, and these signals are decoded to be presented in a form suitable for the facsimile machine that is being used. As a consequence, the adapter in accordance with the invention may be programmed to output data signals of the necessary format for any facsimile machine. Accordingly, it is not necessary for the sender and the receiver of the facsimile message to employ the same protocol. In view of the use of an SCA receiver, it is apparent that the cost of the equipment in accordance with the invention may be very low, and subscription service charges may be unnecessary.

In accordance with one embodiment of the invention, a facsimile signal control system adapted to be connected between a facsimile machine and a telephone line, comprises an RF signal receiver adapted to receive and demodulate RF signals from an antenna, a change-over switch, a first port for connection to a facsimile machine, a second port for connection to a telephone line and an interface circuit. A control circuit is connected to apply the demodulated facsimile signals from the signal receiver to the interface circuit. The control means further comprises means for controlling the changeover switch to selectively connect the first port to either the second port or the interface circuit.

In this system, the interface circuit preferably includes a facsimile modem, as well as a ringing current generator to enable the control means to introduce ringing currents in the received signals. The RF signal receiver preferably comprises an SCA receiver.

The control means preferably comprises a microprocessor connected to receive the output of the SCA receiver.

BRIEF DESCRIPTION OF THE DRAWINGS

In order that the invention may be more clearly understood, it will now be disclosed in greater detail with reference to the accompanying drawing, wherein:

FIG. 1 is a simplified block diagram of a system employing the adapter of the invention; and FIG. 2 is a more detailed block diagram of an SCA adapter in accordance with the preferred embodiment of the invention.

DETAILED DESCRIPTION OF THE PREFERRED EMBODIMENTS

Referring now to the drawings, and particularly to FIG. 1, therein is illustrated a facsimile system in accordance with the invention, comprised of an SCA adapter 10 connected to receive RF signals via an antenna 11, a telephone line 12 connected to the adapter 10, and a facsimile machine 13 coupled to the adapter 10. The facsimile machine may be comprised, for example, of a conventional GII or GIII facsimile machine, or a facsimile card in a personal computer. The adapter 10 is also coupled to a power supply 14.

In accordance with the invention, the facsimile machine may receive facsimile signals from, and direct facsimile signals to, the telephone line 12 in conventional manner. In addition, the facsimile machine may receive facsimile signals that have been received from the antenna 11 as RF signals and converted in the adapter 10.

As illustrated in FIG. 2, an SCA facsimile adapter 10 in accordance with the invention is comprised a convential SCA (Subsidiary Communication Authority) receiver 20 for receiving and demodulating signals modulated on a subcarrier of an FM carrier. The FCC has recently approved subcarrier signal transmission which the adapter of the invention employs. These signals are modulated on subcarriers of for example 57 kHz, 67 kHz or 92 kHz, the subcarrier being frequency modulated on a carrier in the FM broadcast band, for example. Since signals modulated on a 57 kHz subcarrier are frequently used for paging systems, it is preferable that the system of the invention employ either a 67 kHz subcarrier or a 92 kHz subcarrier.

An embodiment of the present receiver may include an RF amplifier stage 21 adapted to receive RF signals via the antenna , a mixer stage 22 for mixing the received RF signals with the oscillations of a local oscillator 23 to produce intermediate frequency oscillations, an intermediate frequency amplifier 24 for amplifying the intermediate frequency signals, an SCA detector 25 for detecting the intermediate frequency signals, and an SCA decoder 26 for decoding the detected signals to produce SCA signals.

The adapter 10 of FIG. 2 further includes a microprocessor 30 connected to receive the output of the decoder 26. The program of the microprocessor, stored in the memory 31, controls the operation of changeover switch 32 for connecting either the telephone line 12 or the telephone line interface 40 to the facsimile machine connected to port 41 of the adapter.

The program of the microprocessor 30 tests the signals received from the SCA for the presence of a signal header corresponding to a received facsimile signal. The microprocessor 30 also tests the line 41 to determine the present status of the line, i.e. whether calls are currently being processed thereon via the telephone line 12. In the absence of such communication, or in the event that signals from the SCA adapter are assigned a higher priority, the signals received by the microprocessor (after error checking, if desired) are applied to the facsimile modem 50 for application to the change-over switch 32 via the telephone line interface 40. At this time the change-over switch is controlled to connect the interface 40 to the communication line 41. In addition, the microprocessor controls the interface 40 to apply ringing current from generator 51 to the interface, for application to the facsimile machine. Upon answering by the facsimile machine, the signals fed back on line 41 are sensed by the microprocessor 30 to disconnect the ringing current generator.

The microprocessor 30 is also connected to control an LCD display 60, and to receive control and programming instructions from a keyboard 61.

In accordance with the preferred embodiment of the invention, the program of the microprocessor 30 is responsive to the absence of the reception of facsimile signals from the SCA receiver, to control the change-over switch 32 to enable normal communication between the facsimile machine and the telephone line.

If, however, a facsimile message is received from the SCA receiver, and the facsimile machine is not currently communicating via the telephone lines (either receiving or transmitting), the adapter will proceed with a hand shaking procedure with the facsimile machine to establish the communication channel from the SCA receiver to the facsimile machine via the change-over switch 32.

In this instance, there is sufficient time remaining, after the file header of the RF broadcast facsimile message has been detected by the adapter, to establish the communication link for receiving an SCA file.

During the period that a communication channel is set up in this manner, the adapter will continue to control the change-over switch to activate the facsimile machine, just as if a conventional facsimile message were being received via the telephone line. The SCA facsimile file has a header at the start of the file, as well as a coded message at the end of the file, which include the sender's phone number, (voice number and/or facsimile number), ID., file serial number, etc.

If required, after the completion of an SCA facsimile transmission, a feed back to the sender via wired telephone line can be activated, to form a closed communication loop with the feed back.

If a file has been aborted, or the message transmission not completed, or the error rate exceeds a given level, or a skip in the serial number has been detected, the entire message can be resent to the sender for transmission via RF SCA again, or wired lines via telephone fax. The display 60 can display any desired messages, for example messages concerning missed calls, calls to be resent, etc.

In order to avoid conflicts that may occur if an SCA file is received via the SCA receiver when the facsimile machine is either in the transmitting or sending mode via the telephone line, the program can be configured to control which of the communication channels has the higher priority. If the higher priority has been given to SCA reception, the adapter will interrupt the communication link of the facsimile machine via the telephone lines and establish the communication channel of the SCA, to resolve a conflict. In this case, the interrupted file can generate a feed back message to the other party so that the file can be either resent later or the other party may be asked to try again later.

If SCA communication has been set to have a lower priority, then the adapter can be set to do nothing, upon reception of an SCA signal when the facsimile machine is currently in use. When the next SCA message is received, a skip in the serial number of the message, due to the loss of the previous message, will be noted, thereby providing the user of the facsimile machine to request that the earlier message be resent. Alternatively, the sender's information in the header of the received file may be stored, to effect the generation and sending of a feedback message to the sender via a wired phone line when the phone line is released.

The SCA adapter in accordance with the invention can be a stand alone box connected to a Fax machine, or a circuit board/module mounted inside the Fax machine or a personal computer. When the PC/Fax machine receives an SCA signal, it will effect the protocol conversion directly and apply the signal to the output of the compter (Printer, Secteen, etc.). When the switch control is returning the message back to the sender, it uses the Fax modem to do the communication set-up.

A Fax Wired Communication Network can be used in a PSTN (Public Switched Telephone Network) or in a leased line.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A facsimile signal control system adapted to be connected between a facsimile machine and a telephone line, comprising:
    means for receiving and demodulating RF signals received from an antenna;
    means for establishing communication between the telephone line and the facsimile machine; and
    control means for terminating said telephone line communication in response to a detection of a receipt of said RF signals so as to establish communication between said receiving means and the facsimile machine, said control means being responsive to a detection of an absence of said RF signals for reestablishing communication between the telephone line and the facsimile machine.

2. The facsimile signal control system of claim 1, wherein said receiving and demodulating means receives and demodulates data which is modulated onto the subsidiary communication authority sub-carrier frequency range.

3. The facsimile signal control system of claim 1, further comprising feedback means for communicating a transmission receipt acknowledgement to an RF signal source which transmitted said RF signals after receipt of said RF signals by said receiver means.

4. The facsimile signal control system of claim 1, wherein said receiving and demodulating means receives and demodulates frequencies in the FM broadcast band.

5. The facsimile signal control system of claim 1, further comprising a modem for connecting the telephone line and said facsimile machine.

6. The facsimile signal control system of claim 5, further comprising a ringing current generator, said control means comprising means for applying the output of said ringing current generator to said facsimile machine.

7. The facsimile signal control system of claim 1, wherein said control means comprises a microprocessor connected to receive an output of said receiving means.

8. The facsimile signal control system of claim 7, wherein said microprocessor detects the presence of an output from said receiving and demodulating means so as to establish communication with said receiving and demodulating means.

9. The facsimile signal control system of claim 1, wherein said receiving and demodulating means is an RF signal receiver.

10. The facsimile control system of claim 9, wherein said RF signal receiver comprises an SCA receiver.

11. A facsimile signal control system, comprising:
receiver means for receiving and demodulating radiowave signals picked up from an antenna; and
communication means responsive to a detection of a presence of said demodulated radiowaves at said receiver means for establishing communication between said receiver means and a facsimile apparatus, said communication means also being responsive to a detection of an absence of said demodulated radiowaves at said receiver means for establishing communication between a telephone line and the facsimile apparatus.

12. A system as in claim 11, wherein said receiver means is formed for receiving and demodulating radiowaves which are in subsidiary communication authority sub-carrier frequency range, said communication means being responsive to the demodulated radiowaves received from the subsidiary communication authority carrier frequency range.

13. A facsimile signal control system adapted to be connected between a facsimile machine and a telephone line, comprising:
means for receiving and demodulating RF signals received from an antenna;
means for establishing communication between the telephone line and the facsimile machine; and
control means for terminating said telephone line communication in response to receipt of said RF signals so as to establish communication between said receiving means and the facsimile machine, said control means being responsive to an absence of said RF signals for reestablishing communication between the telephone line and the facsimile machine, said control having selection means for selecting signal reception priority between signals received from the telephone line and signals received from said antenna so as to establish communication with a selected signal in the event of simultaneous reception.

14. The facsimile control system of claim 13, wherein said selection means is manually settable for selecting which one of said signals from the telephone line and from said antenna is said selected signal.

15. A facsimile signal control system, comprising:
receiver means for receiving and demodulating radiowave signals picked up from an antenna; and
communication means responsive to a presence of said demodulated radiowaves at said receiver means for establishing communication between said receiver means and a facsimile apparatus, said communication means also being responsive to an absence of said demodulated radiowaves at said receiver means for establishing communication between a telephone line and the facsimile apparatus; said communication means including means for detecting a presence and an absence of said demodulated radiowave signals and including switch means for establishing communication between the facsimile machine and one of said receiver means and the telephone line in accordance with detection of one of said presence and absence of said radiowave signals, respectively, by said detecting means.

16. A system as in claim 15, further comprising:
means for transmitting a signal indicative that communication with the facsimile apparatus was terminated for the other of the telephone line and said receiver means in response to said prioritizing means.

17. A system as in claim 16, wherein said transmitting means transmits the signal to the telephone line.

18. A facsimile signal control system adapted to be connected between a facsimile machine and a telephone line, comprising:
an RF signal receiver adapted to receive and demodulate RF signals from an antenna;
means for establishing communication with a telephone line;
a change-over switch;
a first port for connection to a facsimile machine;
a second port for connection to said telephone line;
a modem;
control means, comprising means for applying said demodulated facsimile signals from said signal receiver to said modem;
circuit means for connecting said second port and said modem to said change-over switch; and
said control means including detection means, said detection means being responsive to the absence of said demodulated facsimile signals at an output of said receiver for maintaining communication with said first port to said second port via said change-over switch and being responsive to the presence of said demodulated facsimile signal for applying an output of said modem to said first port via said circuit means and said change-over switch;
said control means further including selection means for selecting signal reception priority between signals received from the telephone line and signals received from said antenna so as to establish communication with a selected signal in the event of simultaneous reception.

19. A facsimile signal control system adapted to be connected between a facsimile machine and a telephone line, comprising:
means for receiving and demodulating RF signals received from an antenna;
means for establishing communication between the telephone line and the facsimile machine;
control means for terminating said telephone line communication in response to receipt of said RF signals so as to establish communication between said receiving means and the facsimile machine, said control means being responsive to an absence of said RF signals for reestablishing communication between the telephone line and the facsimile machine; and
feedback means for communicating a transmission receipt acknowledgement to an RF signal source which transmitted said RF signals after receipt of said RF signals by said receiver means and for transmitting said transmission receipt acknowledgement to the telephone line for receipt by said RF signal source.

20. A facsimile signal control system adapted to be connected between a facsimile machine and a telephone line, comprising:

means for receiving and demodulating RF signals received from an antenna;

means for establishing communication between the telephone line and the facsimile machine; and control means for terminating said telephone line communication in response to receipt of said RF signals so as to establish communication between said receiving means and the facsimile machine, said control means being responsive to an absence of said RF signals for reestablishing communication between the telephone line and the facsimile machine said control means comprises a microprocessor connected to receive an output of said receiving means, said microprocessor detecting the presence of an output from said receiving and demodulating means so as to establish communication with said receiving and demodulating means, said microprocessor detecting the absence of an output from said receiving and demodulating means to establish communication with the telephone line.

21. A facsimile signal control system, comprising:

receiver means for receiving and demodulating radiowave signals picked up from an antenna;

communication means responsive to a presence of said demodulated radiowaves at said receiver means for establishing communication between said receiver means and a facsimile apparatus, said communication means also being responsive to an absence of said demodulated radiowaves at said receiver means for establishing communication between a telephone line and the facsimile apparatus;

means for sensing signals from the telephone line when said demodulated radiowave signals are at said receiver means; and prioritizing means responsive to said sensing means for prioritizing communication with the facsimile apparatus as between one of the telephone line and said receiver means so as to terminate communication with the other of the telephone line and said receiver means.

22. A facsimile signal control system, comprising:

receiver means for receiving and demodulating radiowave signals picked up from an antenna;

communication means responsive to a presence of said demodulated radiowaves at said receiver means for establishing communication between said receiver means and a facsimile apparatus, said communication means also being responsive to an absence of said demodulated radiowaves at said receiver means for establishing communication between a telephone line and the facsimile apparatus; and means for transmitting a signal indicative that communication with the facsimile apparatus was terminated prematurely even when the communication was with the receiver means.

* * * * *